United States Patent
Skripkin

(10) Patent No.: US 8,364,442 B2
(45) Date of Patent: Jan. 29, 2013

(54) AUTOMATED STRUCTURAL INTERPRETATION

(75) Inventor: Sergey Skripkin, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 419 days.

(21) Appl. No.: 12/705,642

(22) Filed: Feb. 15, 2010

(65) Prior Publication Data

US 2010/0211324 A1 Aug. 19, 2010

Related U.S. Application Data

(60) Provisional application No. 61/153,002, filed on Feb. 17, 2009.

(51) Int. Cl.
*G06F 19/00* (2011.01)
*G06F 17/40* (2006.01)
*G01V 1/30* (2006.01)
*G06T 1/00* (2006.01)

(52) U.S. Cl. ......... 702/189; 235/411; 382/103; 702/187

(58) Field of Classification Search ................ 73/167, 73/432.1; 235/400, 411; 382/100, 103; 701/400, 701/408, 514, 519; 702/1, 2, 14, 127, 187, 702/189; 708/100, 105, 200, 290
See application file for complete search history.

(56) References Cited

U.S. PATENT DOCUMENTS

| | | | | |
|---|---|---|---|---|
| 2,800,639 A | * | 7/1957 | Lee | 367/53 |
| 2,908,889 A | * | 10/1959 | Piety | 367/63 |
| 2,978,673 A | * | 4/1961 | Graham | 367/49 |
| 3,217,289 A | * | 11/1965 | Elliott et al. | 367/40 |
| 3,246,130 A | * | 4/1966 | Rubin | 708/290 |
| 3,295,128 A | * | 12/1966 | Canaday et al. | 342/129 |
| 3,304,409 A | * | 2/1967 | Snowdon et al. | 235/414 |
| 4,745,550 A | | 5/1988 | Witkin et al. | |
| 4,745,562 A | | 5/1988 | Prazdny | |
| 5,038,378 A | | 8/1991 | Chen | |
| 5,416,750 A | | 5/1995 | Doyen et al. | |
| 5,444,619 A | | 8/1995 | Hoskins et al. | |
| 5,563,949 A | | 10/1996 | Bahorich et al. | |
| 5,764,283 A | * | 6/1998 | Pingali et al. | 348/169 |
| 5,987,388 A | | 11/1999 | Crawford et al. | |
| 6,018,498 A | | 1/2000 | Neff et al. | |
| 6,240,370 B1 | | 5/2001 | Sonneland et al. | |
| 6,463,387 B1 | | 10/2002 | Runnestrand et al. | |
| 6,473,697 B2 | | 10/2002 | Bouts et al. | |
| 6,640,190 B2 | | 10/2003 | Nickel | |
| 6,735,526 B1 | | 5/2004 | Meldahl et al. | |
| 6,941,222 B2 | * | 9/2005 | Yano et al. | 701/420 |
| 6,950,786 B1 | | 9/2005 | Sonneland et al. | |
| 7,069,149 B2 | | 6/2006 | Goff et al. | |
| 7,082,368 B2 | | 7/2006 | Nickel | |

(Continued)

FOREIGN PATENT DOCUMENTS

| | | | | |
|---|---|---|---|---|
| GB | 2467852 A | * | 8/2010 | |
| JP | 5-73680 A | * | 3/1993 | |

(Continued)

*Primary Examiner* — Edward Cosimano

(57) ABSTRACT

Embodiments of automated structural interpretation are described. In some embodiments, a method includes identifying one or more object points belonging to an object to be tracked; tracking a trajectory of the one or more object points, including: calculating a plurality of etalons around at least one of the one or more object points using one or more different angular parameters; selecting one or more candidate points for evaluation; extracting one or more samples from around the one or more candidate points; and evaluating a next trajectory location of the one or more object points based at least partially on the one or more samples and one or more of the plurality of etalons.

20 Claims, 3 Drawing Sheets

U.S. PATENT DOCUMENTS

| | | |
|---|---|---|
| 7,248,539 B2 | 7/2007 | Borgos et al. |
| 7,319,330 B2 | 1/2008 | Amundsen |
| 7,330,791 B2 | 2/2008 | Kim et al. |
| 7,423,432 B2 | 9/2008 | Amundsen |
| 7,484,563 B2 | 2/2009 | Zazovsky et al. |
| 7,567,084 B2 | 7/2009 | Eidesmo et al. |
| 7,613,321 B2 * | 11/2009 | Altherr et al. .................. 382/103 |
| 7,627,429 B2 | 12/2009 | Li et al. |
| 7,630,865 B2 | 12/2009 | Berkovitch et al. |
| 7,693,310 B2 * | 4/2010 | Kato et al. .................... 382/118 |
| 7,868,917 B2 * | 1/2011 | Nakamura ............... 348/208.14 |
| 2002/0161517 A1 * | 10/2002 | Yano et al. .................... 701/209 |
| 2005/0196017 A1 * | 9/2005 | Altherr et al. ................. 382/103 |
| 2006/0042793 A1 | 3/2006 | Del Campo et al. |
| 2006/0093185 A1 * | 5/2006 | Kato et al. .................... 382/103 |
| 2007/0115363 A1 * | 5/2007 | Nakamura ............... 348/208.14 |
| 2009/0024357 A1 * | 1/2009 | Aso et al. ...................... 702/181 |
| 2009/0132169 A1 | 5/2009 | Bordakov |
| 2009/0187391 A1 | 7/2009 | Wendt et al. |
| 2010/0034422 A1 * | 2/2010 | James et al. .................. 382/103 |
| 2011/0274175 A1 * | 11/2011 | Sumitomo ............... 375/240.16 |

FOREIGN PATENT DOCUMENTS

| | | |
|---|---|---|
| WO | 2008/034012 A2 | 3/2008 |
| WO | 2009048692 A2 | 4/2009 |

* cited by examiner

AUTOMATED STRUCTURAL INTERPRETATION

CROSS-REFERENCE TO RELATED APPLICATIONS

This patent application claims priority under 35 USC §119 (e) from expired U.S. Provisional Patent Application No. 61/153,002 filed Feb. 17, 2009, which application is incorporated herein by reference.

FIELD OF THE INVENTION

The present disclosure relates to computational simulation and analysis of geological formations, and more specifically, to automated structural interpretation.

BACKGROUND

Research operations, such as surveying, drilling, testing, and computational simulations, are typically performed to help locate and extract valuable hydrocarbon resources. The information developed during such research operations may be used to assess geological formations, and to locate the desired subterranean assets.

Fault identification and interpretation is one of the major challenges in seismic interpretation. Several existing methods have been developed to detect seismic faults, including those methods disclosed, for example, in U.S. Pat. No. 7,630,865 issued to Berkovitch et al. U.S. Pat. No. 7,330,791 issued to Kim et al., U.S. Pat. No. 7,069,149 issued to Goff et al., and U.S. Pat. No. 6,735,526 issued to Meldahl et al. In contrast with seismic horizons interpretation, however, conventional techniques for identification and interpretation of seismic faults typically suffer from a lack of accurate and robust automatic solutions. Thus, although desirable results have been achieved using conventional techniques, there is room for substantial improvement.

SUMMARY

The present disclosure relates to methods and systems for automated structural interpretation of geological structures, including seismic fault detection and tracking. Embodiments of methods and systems in accordance with the teachings of the present disclosure may advantageously provide automated seismic interpretation functionalities, thereby reducing time and costs associated with seismic structural interpretation activities.

In some embodiments, a method for automated interpretation of a seismic structure including: identifying one or more object points belonging to an object to be tracked; tracking a trajectory of the one or more object points, including: calculating a plurality of etalons around at least one of the one or more object points using one or more different angular parameters; selecting one or more candidate points for evaluation; extracting one or more samples from around the one or more candidate points; and evaluating a next trajectory location of the one or more object points based at least partially on the one or more samples and one or more of the plurality of etalons.

This summary is merely intended to provide a brief synopsis of a possible implementation of, and possible aspects or advantages of, systems and methods in accordance with at least some embodiments of the present disclosure. This summary is further intended as merely an aid to the reader's understanding of such particular embodiments, and is not intended to define or limit other embodiments of systems and methods disclosed elsewhere herein.

BRIEF DESCRIPTION OF THE DRAWINGS

The detailed description is described with reference to the accompanying figures, in which similar or identical reference numerals may be used to identify common or similar elements.

DETAILED DESCRIPTION

This disclosure is directed to systems and methods for automated structural interpretation of geological structures, including seismic fault detection and tracking. More specifically, embodiments of systems and methods in accordance with the teachings of the present disclosure may be used for automatic interpretation of faults and other structural features in three-dimensional (3D) seismic data. In at least some implementations, such systems and methods may advantageously improve the quality of seismic interpretation, while reducing time and costs associated with such analyses.

Generally, in at least some implementations, calculated quantities termed "etalons" may be used to calculate a fitness function. As used herein, the term etalons refers to one or more samples created around the same point, and such etalons may contain information (partial or full) about such points. For each candidate point that may be next along a trajectory being tracked, at least one sample is determined. At the same time, a collection of samples (etalons) is available around previous points. Thus, etalons are created around points that are already "tracked", and new samples are calculated around new candidate points and then compared with etalons.

In at least some implementations, a fitness function for each candidate may be defined, for example, as a distance to a most similar sample in the etalon. More specifically, in at least some implementations, one point may be picked by a user, and then volume images (samples) may be created of that point under different angles to provide one or more etalons. A candidate point may then be selected near the original one, and an image may be extracted for that candidate point (e.g. a candidate point having 0 rotation). An image in a previously-created collection is selected that most closely resembles (looks most similar to) the current, non rotated image. Once found, the similarity between two points (original and candidate) is assumed as the similarity between these two images. These and other aspects of methods and systems in accordance with the teachings of the present disclosure are described more fully below with reference to the accompanying figures.

Exemplary Environment

Figure 1:
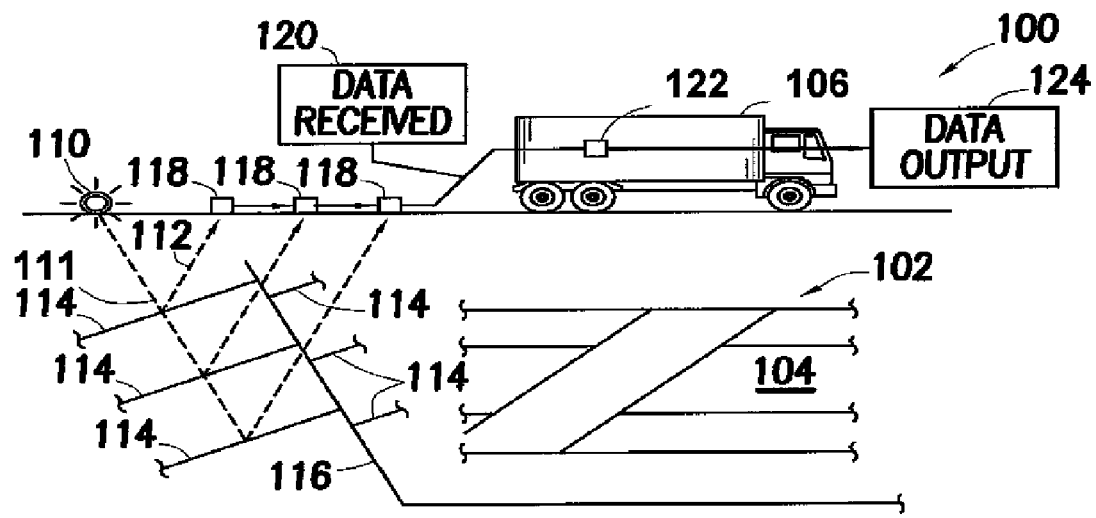
FIG. 1 is a schematic view of an exemplary environment which may be modeled in accordance with the teachings of the present disclosure.

FIG. 1 is a schematic view of an exemplary environment 100 which may be modeled in accordance with the teachings of the present disclosure. More specifically, in this embodiment, the environment (or oilfield) 100 includes a subterranean formation 102 containing a reservoir 104 therein. A seismic truck 106 performs a survey operation by producing one or more waves 111 (e.g. sonic waves, ultrasonic waves, electromagnetic waves, etc.) that may be used to measure properties of the subterranean formation 102.

More specifically, as shown in FIG. 1, one or more waves 111 are emitted by a source 110 and reflect off one or more horizons 114 in an earth formation 116. The reflected waves 112 are then received or detected by one or more sensors, such as geophone-receivers 118 or the like, situated on the surface. In at least some embodiments, the geophone-receivers 118 produce electrical output signals in response to the characteristics of the reflected waves 112 (e.g. amplitude, frequency, etc.), referred to as data received 120 in FIG. 1.

The data received 120 may be provided as input to a computer 122 (e.g. located in the seismic truck 106). Responsive to the input data, the computer 122 may generate a seismic data output 124 which may be stored, transmitted, or further processed as desired, including by various analysis techniques in accordance with the teachings of the present disclosure.

Additional aspects of systems and methods of automated detection of seismic faults are described in the following sections. It should be appreciated that the systems and methods described herein are merely exemplary, and are included for illustration purposes and should not be construed as limiting.

Exemplary Processes

Seismic interpretation can be conducted using a three-dimensional (3D) image analysis approach in association with a mathematical model in accordance with the teachings of the present disclosure. Embodiments of systems and methods in accordance the present disclosure may advantageously provide highly accurate, automated interpretations of geological survey information, and such results may be used as multi-dimensional attribute data for subsequent analyses. In at least some implementations, the techniques disclosed herein can be complimented with expert knowledge regarding reservoirs and reservoir engineering.

Fault identification and interpretation is one of the major challenges in seismic interpretation. But in contrast with seismic horizons interpretation, the conventional techniques for identification and interpretation of seismic faults typically suffer from a significant lack of accurate and robust automatic solutions. As a consequence, conventional methods may require labor-intensive, time-consuming manual fault interpretation which entails numerous repetitive similar pickings of faults intersections with different seismic sections.

On the other hand, in at least some embodiments in accordance with the teachings of the present disclosure, it may be assumed that once a fault or any other structural event is picked on only a few sections (or even one), the picking process could be automatically continued if information from manually picked points is extracted and used properly.

To begin to describe methods and systems for automated fault interpretation in accordance with the teachings of the present disclosure, several definitions will now be introduced. For example, as used herein, a template $\Omega$, denotes an array of points $\omega$ with integer Cartesian coordinates (i,j,k) selected according to some custom rule, as shown in the following Equation (1):

$$\Omega = \{\omega_1, \ldots, \omega_n\}, \omega_m = (i_m, j_m, k_m) \tag{1}$$

Similarly, as used herein, a sample $\Lambda$ extracted using a template around kernel point K with parameters $(\phi, \theta)$ denotes an array of $\lambda$, defined by the following Equation (2):

$$\theta_\Omega(K, \phi, \theta, \Psi) = (\lambda_1, \ldots, \lambda_n), \lambda_m = S(K + \omega_m^{\phi, \theta, \Psi}) \tag{2}$$

where S(t) denotes interpolated value of 3D seismic volume at point t with Cartesian coordinates (i,j,k), indexes $\phi$, $\theta$, $\Psi$, at point $\omega$ mean sequential rotation of applied template $\Omega$ to angle $\phi$ around X axis, to angle $\theta$ around axis Y and to angle $\Psi$ around axis Z.

Now, using notation introduced above it is possible to define a new measure of distance between two arbitrary points K1 and K2 in seismic volume, referred to herein as a sample-based distance, as shown in the following Equation (3):

$$L(\Lambda_\Omega(K_1, \varphi_1, \theta_1, \psi_1), \Lambda_\Omega(K_2, \varphi_2, \theta_2, \psi_2)) = \frac{\|\Lambda_\Omega(K_1, \varphi_1, \theta_1, \psi_1) - \Lambda_\Omega(K_2, \varphi_2, \theta_2, \psi_2)\|}{\|\Lambda_\Omega(K_1, \varphi_1, \theta_1, \psi_1)\| + \|\Lambda_\Omega(K_2, \varphi_2, \theta_2, \psi_2)\|} \tag{3}$$

This measure allows a defining degree of similarity between different points in seismic volume in terms of selected template and angles. For example, a simple one-point template $\Omega = \{(0,0,0)\}$ can lead to direct comparison of seismic amplitudes in locations K1 and K2.

In at least some implementations, an assumption behind the one or more automated tracking algorithms proposed herein is that every point belonging to a particular seismic feature has a set of analogues or similar points on the same feature in terms of a sample-based distance in some range of templates. Furthermore, in at least some implementations, one can also assume that two points with a small sample-based distance between them represent the same object (or similar objects).

Figure 2:
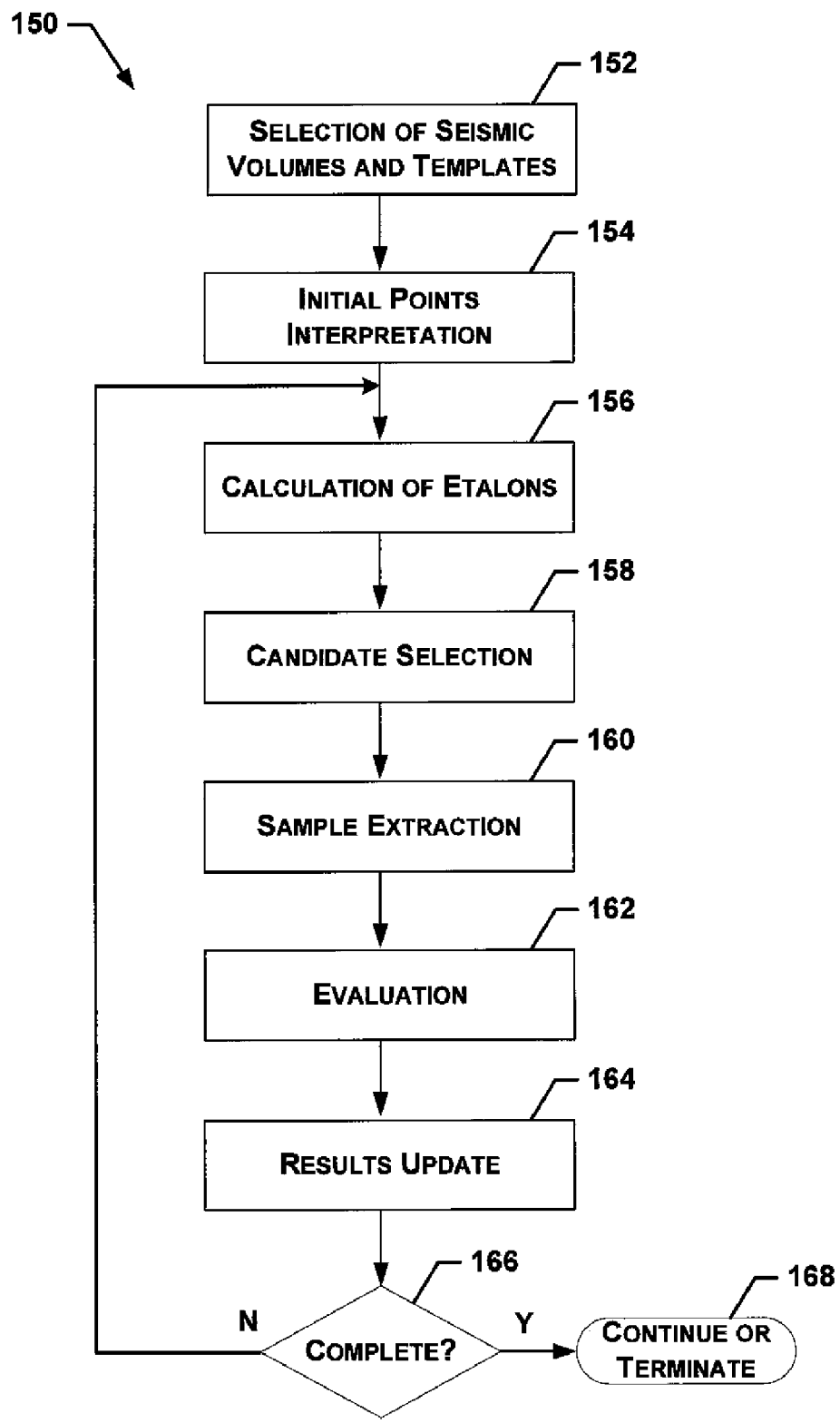
FIG. 2 is a flowchart of an embodiment of a method in accordance with the teachings of the present disclosure.

The definitions and notations introduced above allow for a full step-by-step description of an embodiment of a method for automated detection of seismic faults. For example, FIG. 2 is a flowchart of an embodiment of a method 150 in accordance with the teachings of the present disclosure. In this embodiment, the method 150 includes selection of seismic volumes and corresponding templates to be used for interpretation at 152. The notations introduced above can be generalized for a multidimensional case, such that different seismic volumes (original amplitudes or any seismic attributes) may be used for interpretation.

An initial points interpretation is performed at 154. As mentioned above, some points belonging to the object to be tracked (e.g. faults, stratigraphic terminations, etc) could be identified manually. Alternately, the initial points belonging to the object to be tracked may be selected based on any suitable automated or semi-automated logic. After the initial points are selected or otherwise generated, they may be used as references for automated picking.

With continued reference to FIG. 2, the method 150 further includes calculation of etalons at 156. It will be appreciated that, as used herein, an etalon denotes an ordered set of samples A extracted around the same kernel point using different angle parameters $\phi$, $\theta$, and $\Psi$. The etalons are constructed around points that were picked on previous iterations (including an original starting point) and used for candidate evaluation (described below). An etalon may be expressed as shown by the following Equation (4):

$$Et_\Omega(K, \Phi, \Theta, \Psi) = \{\Lambda_\Omega(K, \phi_i, \theta_j, \psi_k)\}, \phi_i \in \Phi, \theta_j \in \Theta, \psi_k \in \Psi \tag{4}$$

With respect to Equation (4) shown above, the etalon $Et_\Omega$ represents samples extracted around kernel point K in 3D space, where $\Phi$, $\Theta$ and $\Psi$ denote sets of rotation angles used for etalon calculation.

In at least some implementations, etalon sets may include a history of the overall iterative process and may be invariant to any geometrical changes in reservoir layers or faults. Ranges of rotation angles and number of nodes in sets $\Phi$, $\Theta$ and $\Psi$ can be defined by a user (or by a suitable automated or semi-automated process) and play a role in supporting this invariability.

When the etalon sets are updated (at 156), the points that will be the candidates for evaluation on a current iteration of the algorithm are selected at a candidate selection 158. More specifically, let p denote the number of a current iteration, let $C_p$ denote the set of candidates on iteration p, let $R_{p-1}$ denote a set of results for the previous p−1 iterations and $K_p$ denotes the result of the algorithm on the previous iteration. The candidate sets can then be created (at 158), for example, according to the following Equation (5):

$$C_p = \left\{ \bigcup_{\tau_1, \tau_2, \tau_3 = -\tau}^{\tau} (K_p + (\tau_1, \tau_2, \tau_3)) \backslash \{C_{P-1} \cup R_{p-1}\} \right\} \quad (5)$$

where the symbol $\tau$ represents a size of cubic area around $k_p$ where candidates are searched.

It means that in some implementations, the candidates of the candidate sets are selected from the points with discrete coordinates within a cube with side $2\sigma+1$ around point $K_p$. In some embodiments as also shown in Equation (5), the algorithm can be made more efficient by removing all previously visited points $C_{p-1} \cup R_{p-1}$.

It will be appreciated that the proposed algorithm for selection of candidates at 158 is not the only one possible, and that a variety of suitable algorithms may be conceived. For example, in various alternate implementations, the candidate selection at 158 may include: visited points may be included to the set; the candidates search can be anisotropic, etc.

With continued reference to FIG. 2, in some implementations, in a sample extraction 160, when the candidate points ($C_{p1}, \ldots C_{pn}$) forming candidates set $C_p$ are selected, samples may be extracted around them using an initial template given by the following Equation (5.5):

$$\vec{\Lambda}\Omega(C_p) = (\Lambda_\Omega(c_{p1}, 0, 0, 0), \ldots \Lambda_\Omega(c_{pn}, 0, 0, 0)) \quad (5.5)$$

The method 150 further includes an evaluation at 162. More specifically, when we have the samples extracted around all candidates (at 160), the samples can be evaluated to find one or more candidates similar to kernels of etalons sets. For purposes of the evaluation of the samples (at 162), a fitness function may be defined in different ways for example by changing a type of the norm in Equation (3). A suitable fitness function is presented by Equation (7) below: Let d (,) define distance between evaluated point K and etalon $Et_t$ as shown in Equation (6):

$$d(K, Et_t) = \min_{u,v,w}(L(\Lambda_\Omega(K, 0, 0, 0), Et_{u,v,w})) \quad (6)$$

where $Et_{u,v,w} = \Lambda_\Omega(K, \phi_u, \theta_v, \psi_w)$ (6.1)

Then let a distance between K and etalons set Et be defined as a weighted sum of distances from K to etalons from Et, given by Equation (6.5) as follows:

$$d(K, Et) = \sum_{i=1}^{p} d(K, Et_i)\eta_i \quad (6.5)$$

where $\eta_i$ i=1, ..., $\rho$ are weights coefficients which can be changed by user or have some predefined values. A fitness function then may be defined by Equation (7) below:

$$H(C_v) = M_v d(c_v, Et) \quad (7)$$

where $M_v$ is a geometrical correction given by Equation (8):

$$M_{pv} = g \cos(\overrightarrow{c_{pv} - R_{p-y}}, \overrightarrow{R_{p-1} - R_{p-y-1}}) + \alpha \quad (8)$$

and where $v_{opt} = \arg\min_v(H(c_v))$ (9).

Figure 3:
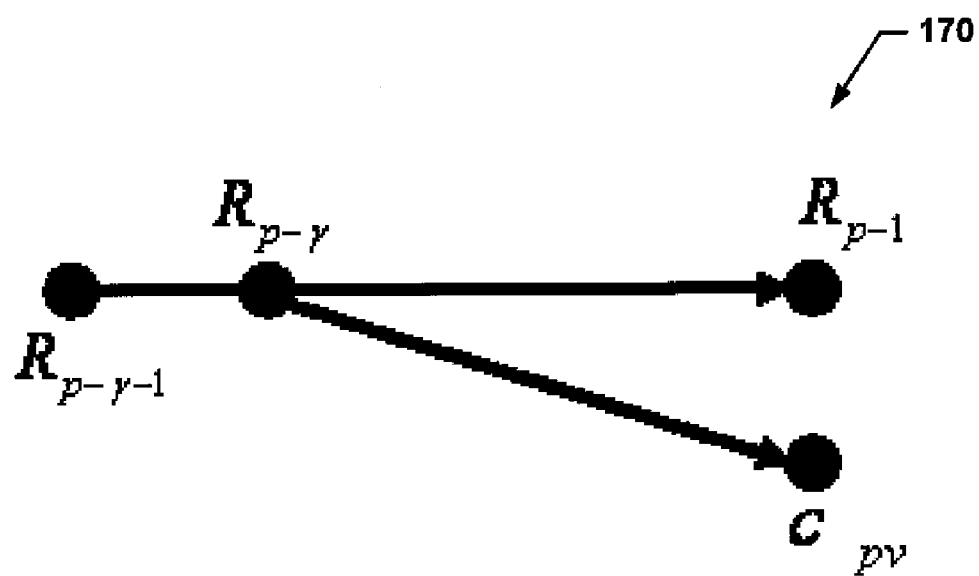
FIG. 3 shows an embodiment of a vector scheme which may be used in accordance with the teachings of the present disclosure.

As is seen from Equation (7), the fitness function can be represented, in some implementations, as a minimum of weighted sums of sample-based distances from the evaluated point to the etalon adjusted for a geometrical correction M. The geometrical correction M is defined in Equation (8), and may be considered a kind of inertia which prevents sudden jumps in the tracking trajectory. FIG. 3 shows a possible example of embodiment of a vector scheme 170 which may be used for calculation of the geometrical correction M in accordance with the teachings of the present disclosure.

In at least some implementations, a candidate point where the fitness function (Equation (7) above) reaches a minimum is the optimal result on the current iteration, and is given by Equation (9) above. One or more stop criteria can be evaluated to abort tracking when the degree of similarity becomes low. For example, suitable stop criteria may be based on an absolute value of the fitness function, or may be calculated relative to the value on the first element, or any other suitable stop criteria may be devised.

As shown in FIG. 2, the method 150 further includes a results update 164. If the stop criteria is passed, a new point may be added to the result set, given by Equation (14) below:

$$R_p = R_{p-1} \cup c_{PVopt} \quad (14)$$

A determination is made whether a requested number of iterations has been reached at 166. If the requested number of iterations is not reached, the method 150 may return to the calculation of etalons (at 156) and repeat the above-described actions until the number of iterations is reached (at 166).

When the method 150 is complete (at 166), the method 150 may continue to other operations or may terminate at 168. Upon completion, the results set R (see Equation (14) above) may include a three-dimensional (3D) trajectory of the tracked object. If more than one point was tracked, all individual result sets can be joined to get a final trajectory.

In one or more implementations, the proposed algorithm(s) discussed above can be useful. Example embodiments of methods and systems described herein are merely exemplary should not be construed to in any way limit the functionality of the methods described above, and/or the scope of the claims listed below. Furthermore, it should be appreciated that one or more of the activities described herein, including the activities described above with respect to FIG. 2, may either be tied to a particular apparatus, or may involve a transformation of something (e.g. data, information, etc.) into a different state or thing.

In at least some implementations, the result of the methods for automatic tracking are highly accurate, and may be of the same quality as the results provided by manual tracking activities. In addition, the stopping mechanism may advantageously prevent false picking and may identify quickly the ambiguous areas.

Similarly, dramatic reductions of time spent for seismic interpretation may be achieved. More specifically, in at least some implementations, the proposed methods generally allow much faster seismic interpretation because the number of manually interpreted sections are reduced by approximately one or two orders of magnitude. In addition, expert knowledge may be taken into account to further enhance performance.

In further implementations, multi-attribute analyses may be achieved. For example, the methods and systems proposed herein may allow the use of different input data for tracking at the same time. This aspect may advantageously improve the quality of the results since structural features may be more visible on some attributes than on original amplitudes.

Exemplary Computational Environment

Figure 4:
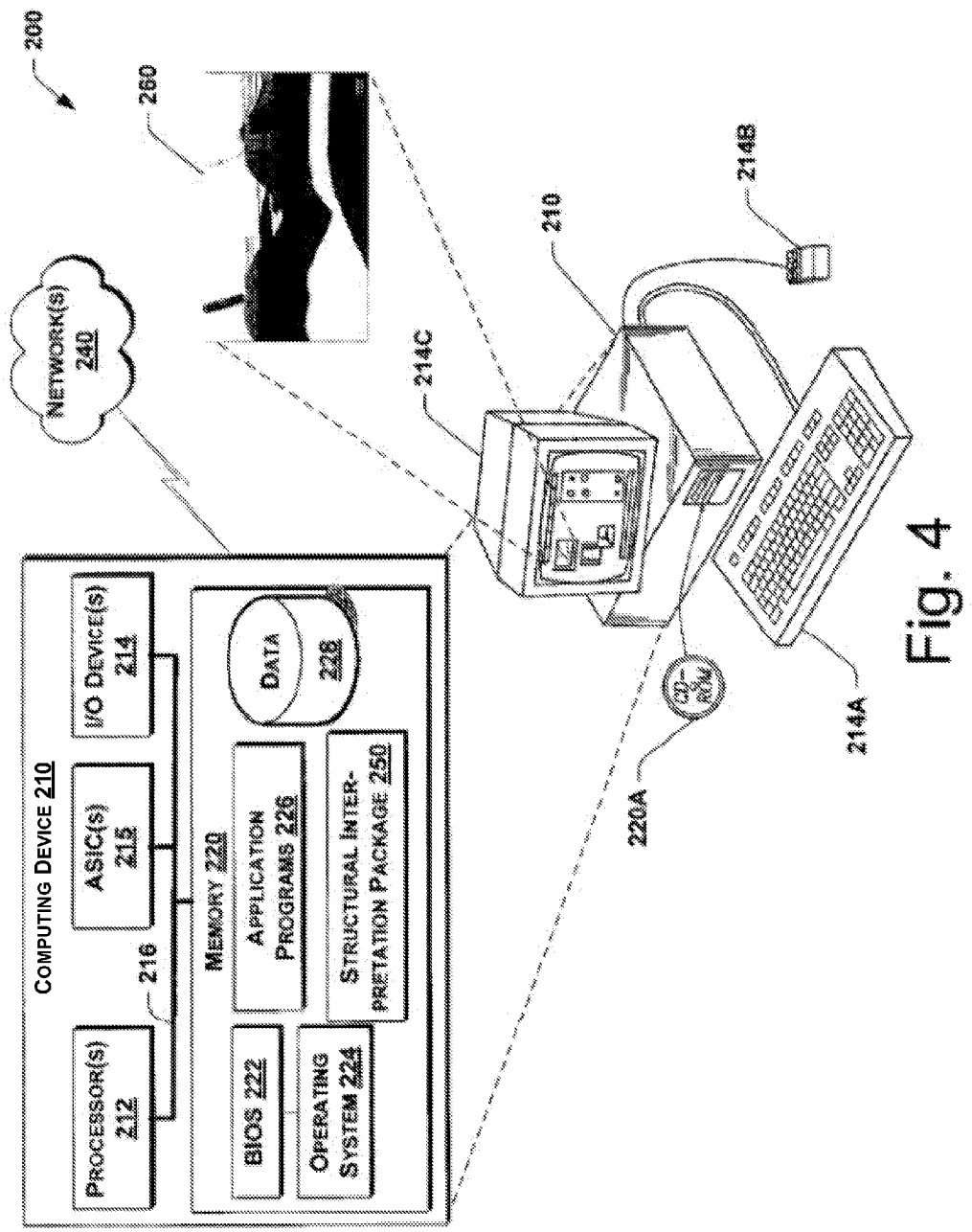
FIG. 4 illustrates an example computing device in which various embodiments of methods and systems in accordance with the teachings of the present disclosure may be implemented.

Systems and methods for automated structural interpretation of geological structures in accordance with the teachings of the present disclosure may be implemented in a variety of computational environments. For example, FIG. 4 illustrates an exemplary environment 200 in which various embodiments of systems and methods in accordance with the teachings of the present disclosure can be implemented. In this implementation, the environment 200 includes a computing device 210 configured in accordance with the teachings of the present disclosure. In some embodiments, the computing device 210 may include one or more processors 212 and one or more input/output (I/O) devices 214 coupled to a memory 220 by a bus 216. One or more Application Specific Integrated Circuits (ASICs) 215 may be coupled to the bus 216 and configured to perform one or more desired functionalities described herein.

The one or more processors 212 may be composed of any suitable combination of hardware, software, or firmware to provide the desired functionality described herein. Similarly, the I/O devices 214 may include any suitable I/O devices, including, for example, a keyboard 214A, a cursor control device (e.g. mouse 214B), a display device (or monitor) 214C, a microphone, a scanner, a speaker, a printer, a network card, or any other suitable I/O device. In some embodiments, one or more of the I/O components 214 may be configured to operatively communicate with one or more external networks 240, such as a cellular telephone network, a satellite network, an information network (e.g. Internet, intranet, cellular network, cable network, fiber optic network, LAN, WAN, etc.), an infrared or radio wave communication network, or any other suitable network. The system bus 216 of the computing device 210 may represent any of the several types of bus structures (or combinations of bus structures), including a memory bus or memory controller, a peripheral bus, an accelerated graphics port, and a processor or local bus using any of a variety of bus architectures.

The memory 220 may include one or more computer-readable media configured to store data and/or program modules for implementing the techniques disclosed herein. For example, the memory 220 may host (or store) a basic input/output system (BIOS) 222, an operating system 224, one or more application programs 226, and program data 228 that can be accessed by the one or more processors 212 for performing various functions disclosed herein.

The computing device 210 may further include a structural interpretation package 250 in accordance with the teachings of the present disclosure. More specifically, the structural interpretation package 250 may be configured to perform structural interpretation and tracking processes of a geological structure 260, including, for example, those processes and activities described above with respect to the method 150 shown in FIG. 2.

As depicted in FIG. 4, the structural interpretation package 250 may be stored within (or hosted by) the memory 220. In alternate implementations, however, the structural interpretation package 250 may reside within or be distributed among one or more other components or portions of the computing device 210. For example, in some implementations, one or more aspects of the structural interpretation functionalities described herein may reside in one or more of the processors 212, the I/O devices 214, the ASICs 215, or the memory 220 (e.g. one or more application programs 226).

In the foregoing description, various techniques have been or may be described in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media may include, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the computing device 210. Combinations of any of the above should also be included within the scope of computer readable media.

Moreover, the computer-readable media included in the system memory 220 can be any available media that can be accessed by the computing device 210, including removable computer storage media (e.g. CD-ROM 220A) or non-removeable storage media. Computer storage media may include both volatile and nonvolatile media (or persistent and non-persistent) implemented in any method or technology for storage of information such as computer-readable instructions, data structures, program modules, or other data. Generally, program modules executed on the computing device 210 may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Referring again to FIG. 4, it will be appreciated that the computing device 210 is merely exemplary, and represents only one example of many possible environments (e.g. computing devices, architectures, etc.) that are suitable for use in accordance with the teachings of the present disclosure. Therefore, the computing device 210 shown in FIG. 4 is not intended to suggest any limitation as to scope of use or functionality of the computing device and/or its possible architectures. Neither should computing device 210 be interpreted as having any dependency or requirement relating to any one or combination of components illustrated in the example computing device 210.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Although embodiments of systems and methods for automated structural interpretation have been described in language specific to structural features and/or methods, it is to be understood that the subject of the appended claims is not necessarily limited to the specific features or methods described. Rather, the specific features and methods are disclosed as exemplary implementations of automated structural interpretation.

What is claimed is:

1. A method, comprising:
   identifying one or more object points belonging to an object to be tracked; and
   tracking a trajectory of the one or more object points, including:
      calculating a plurality of etalons around at least one of the one or more object points using one or more different angular parameters;
      selecting one or more candidate points for evaluation;
      extracting one or more samples from around the one or more candidate points; and
      evaluating a next trajectory location of the one or more object points based at least partially on the one or more samples and one or more of the plurality of etalons.

2. The method of claim 1, wherein calculating a plurality of etalons around at least one of the one or more object points using one or more different angular parameters includes:
   calculating an ordered set of samples extracted around at least one of the one or more object points using different angle parameters $\phi$, $\theta$, and $\psi$.

3. The method of claim 1, wherein selecting one or more candidate points for evaluation includes:
   selecting one or more candidate points given substantially by an expression:

$$C_p = \left\{ \bigcup_{\tau_1,\tau_2,\tau_3=-\tau}^{\tau} (K_p + (\tau_1, \tau_2, \tau_3)) \setminus \{C_{P-1} \cup R_{p-1}\} \right\}$$

where $C_p$ denotes a set of candidates on iteration p,
where $C_{p-1}$ denotes a set of results for a previous iteration p−1,
where $R_{p-1}$ denotes a set of results for a previous iteration p−1,
where $K_p$ denotes a point as a result from a previous tracking iteration,
where $\tau_1$, $\tau_2$, $\tau_3$ correspond to discrete coordinates with a cube with side 2τ+1 around the point $K_p$, and
where $C_{p-1} \cup R_{p-1}$ removes previously visited points from points $\cup_{\tau_1,\tau_2,\tau_3=-\tau}(K_p+(\tau_1,\tau_2,\tau_3))$.

4. The method of claim 1, wherein selecting one or more candidate points for evaluation includes:
   selecting one or more candidate points from within a cube with a side length of 2τ+1 around a point $K_p$, where $K_p$ denotes a result from a previous tracking iteration where τ corresponds to a distance extending along each coordinate direction of the cube around the point $K_p$.

5. The method of claim 1, wherein tracking a trajectory of the one or more object points further includes:
   removing previously visited points $C_{p-1} \cup R_{p-1}$
   where $C_{p-1}$ denotes a set of candidates for a previous iteration p−1, and
   where $R_{p-1}$ denotes a set of results for the previous iteration p−1.

6. The method of claim 1, wherein extracting one or more samples from around the one or more candidate points includes:
   extracting one or more samples from around the one or more candidate points $(c_{p1}, \ldots c_{pt})$ forming set $C_p$ using an expression:

$$\Lambda_\Omega(C_p) = (\iota_{106}(c_{p1},0,0,0), \ldots \Lambda_\Omega(c_{pn},0,0,0))$$

where $\Omega$ represents a one-point template, $\Omega = \{(0,0,0)\}$.

7. The method of claim 1, wherein evaluating a next trajectory location of the one or more object points based at least partially on the one or more samples includes:
   evaluating a next trajectory location of the one or more object points using a fitness function applied to the one or more samples.

8. The method of claim 1, wherein identifying one or more object points belonging to an object to be tracked includes:
   identifying one or more object points belonging to a feature of a geological structure to be tracked.

9. The method of claim 1, wherein evaluating a next trajectory location of the one or more object points based at least partially on the one or more samples includes:
   evaluating a next trajectory location of the one or more object points using a fitness function represented as a minimum of weighted sums of distances from the evaluated point to one or more of the plurality of etalons adjusted for a geometrical correction.

10. The method of claim 9, wherein the geometrical correction is given by:

$$M_{pv} = g \cos(\overline{c_{pv} - R_{p-y}}, \overline{R_{p-1} - R_{p-y-1}}) + \alpha \quad (8)$$

where $M_{pv}$ prevents sudden jumps in a tracking trajectory within the fitness function,
where $R_{p-y}$ is a point prior to $R_{p-1}$, and
where $R_{p-y-1}$ is a point prior to $R_{p-y}$.

11. The method of claim 9, wherein evaluating a next trajectory location of the one or more object points based at least partially on the one or more samples includes:

evaluating a next trajectory location of the one or more object points using a fitness function applied to the one or more samples, the fitness function including:

$$d(K, Et_t) = \min_{u,v,w}(L(\Lambda_\Omega(K, 0, 0, 0), Et_{u,v,w}))$$

where $Et_{u,v,w} = \Lambda_\Omega(K, \phi_u, \theta_v, \psi_w)$, and
where $d(K, Et_t)$ is a distance between points K and $Et_t$.

12. A computing device comprising:
a memory;
one or more processors operatively coupled to the memory;
functionality operable by at least one of the processors or the memory to perform a method of tracking an object point, including:
calculating one or more etalons around the object point using one or more different angular parameters;
selecting a candidate point for evaluation;
extracting one or more samples from around the candidate point; and
evaluating a next possible location of the object point based at least partially on the one or more samples and one or more of the plurality of etalons.

13. The computing device of claim 12, wherein calculating one or more etalons around the object point using one or more different angular parameters includes:
calculating an ordered set of samples extracted around the object point using one or more angle parameters $\phi$, $\theta$, and $\psi$.

14. The computing device of claim 12, wherein selecting a candidate point for evaluation includes:
selecting a candidate point from within a cube with a side length of $2\tau+1$ around a point $K_p$, where $K_p$ denotes a result from a previous tracking iteration where $\tau$ corresponds to a distance extending along each coordinate direction of the cube around the point $K_p$.

15. The computing device of claim 12, wherein evaluating a next possible location of the object point based at least partially on the one or more samples includes:

evaluating a next possible location of the object point using a fitness function applied to the one or more samples.

16. The computing device of claim 12, wherein evaluating a next possible location of the object point based at least partially on the one or more samples includes:
evaluating a next possible location of the object point using a fitness function represented as a minimum of weighted sums of distances from the evaluated point to one or more of the plurality of etalons adjusted for a geometrical correction, wherein the geometrical correction is representative of an inertia which prevents sudden jumps in a tracking trajectory.

17. One or more computer-readable media having a set of computer-readable instructions residing thereon that, when executed, perform acts comprising:
tracking an object point, including:
calculating a plurality of etalons around the object point using a plurality of angular parameters;
selecting a candidate point for evaluation;
extracting one or more samples from around the candidate point; and
evaluating a next possible location of the object point based at least partially on the one or more samples and one or more of the plurality of etalons.

18. The one or more computer-readable media of claim 17, wherein selecting a candidate point for evaluation includes:
selecting a candidate point from within a cube with a side length of $2\tau+1$ around a point $K_p$, where $K_p$ denotes a result from a previous tracking iteration.

19. The one or more computer-readable media of claim 17, wherein evaluating a next possible location of the object point based at least partially on the one or more samples includes:
evaluating a next possible location of the object point using a fitness function applied to the one or more samples.

20. The one or more computer-readable media of claim 17, wherein evaluating a next possible location of the object point based at least partially on the one or more samples includes:
evaluating a next possible location of the object point using a fitness function represented as a minimum of weighted sums of distances from the evaluated point to one or more of the plurality of etalons adjusted for a geometrical correction.

* * * * *